United States Patent
Kishimoto et al.

[11] Patent Number: 5,920,008
[45] Date of Patent: *Jul. 6, 1999

[54] TROUBLE DIAGNOSTIC APPARATUS

[75] Inventors: Youichi Kishimoto, Chigasaki; Yoshihiro Inada, Zama, both of Japan

[73] Assignee: Nissan Motor Co., Ltd, Yokohama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/768,198

[22] Filed: Dec. 17, 1996

[30] Foreign Application Priority Data

Dec. 25, 1995 [JP] Japan ................................. 7-337546

[51] Int. Cl.⁶ ................................................. G01M 15/00
[52] U.S. Cl. ................................................. 73/117.3
[58] Field of Search .................. 73/117.3, 112, 73/113, 114, 115, 116, 117, 117.1, 117.2, 118.1, 118.2, 119 R, 120, 119 A

[56] References Cited

U.S. PATENT DOCUMENTS

| | | | |
|---|---|---|---|
| 4,932,379 | 6/1990 | Tang et al. | 73/117.3 |
| 5,349,299 | 9/1994 | Kanehiro et al. | 73/117.3 |
| 5,505,087 | 4/1996 | Angermaier et al. | 73/117.3 |
| 5,553,488 | 9/1996 | Ishii et al. | 73/117.3 |
| 5,559,285 | 9/1996 | Bryant et al. | 73/117.3 |
| 5,576,963 | 11/1996 | Ribbens et al. | 73/117.3 |
| 5,592,388 | 1/1997 | Bradshaw et al. | 73/117.3 |
| 5,606,118 | 2/1997 | Muth et al. | 73/116 |
| 5,606,120 | 2/1997 | Daicho et al. | 73/117.3 |
| 5,631,411 | 5/1997 | Harms et al. | 73/117.3 |
| 5,631,831 | 5/1997 | Bird et al. | 73/117.3 |
| 5,648,602 | 7/1997 | Hoshina et al. | 73/115 |
| 5,723,780 | 3/1998 | Miwa et al. | 73/118.1 |

Primary Examiner—Richard Chilcot
Assistant Examiner—Eric S. McCall
Attorney, Agent, or Firm—Foley & Lardner

[57] ABSTRACT

A diagnostic apparatus applicable to diagnosis of engine misfire. A diagnostic result is produced for each of at least two diagnoses related to each other. Only one of the diagnostic results having a higher degree of necessity is retained to indicate a malfunction.

6 Claims, 6 Drawing Sheets

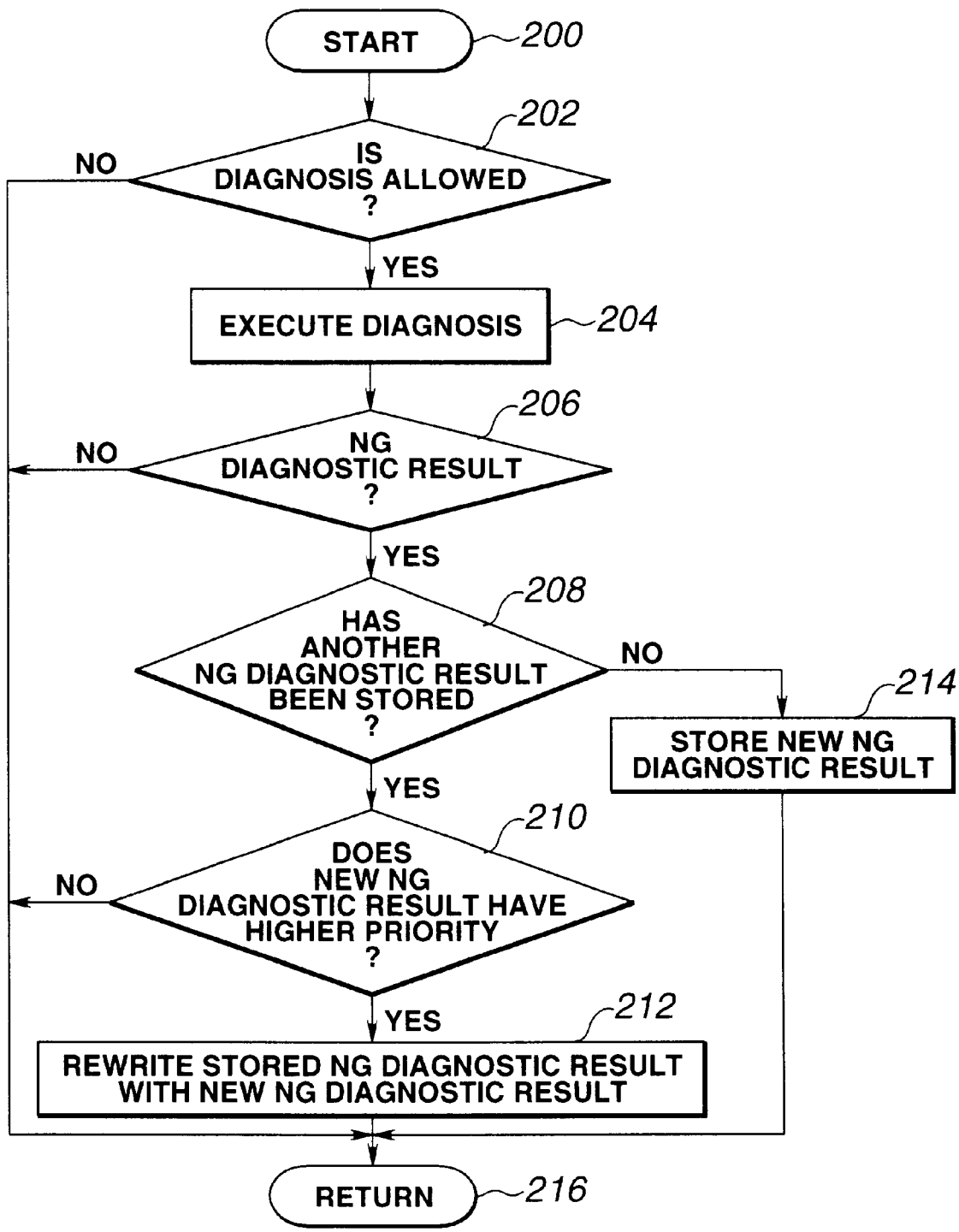

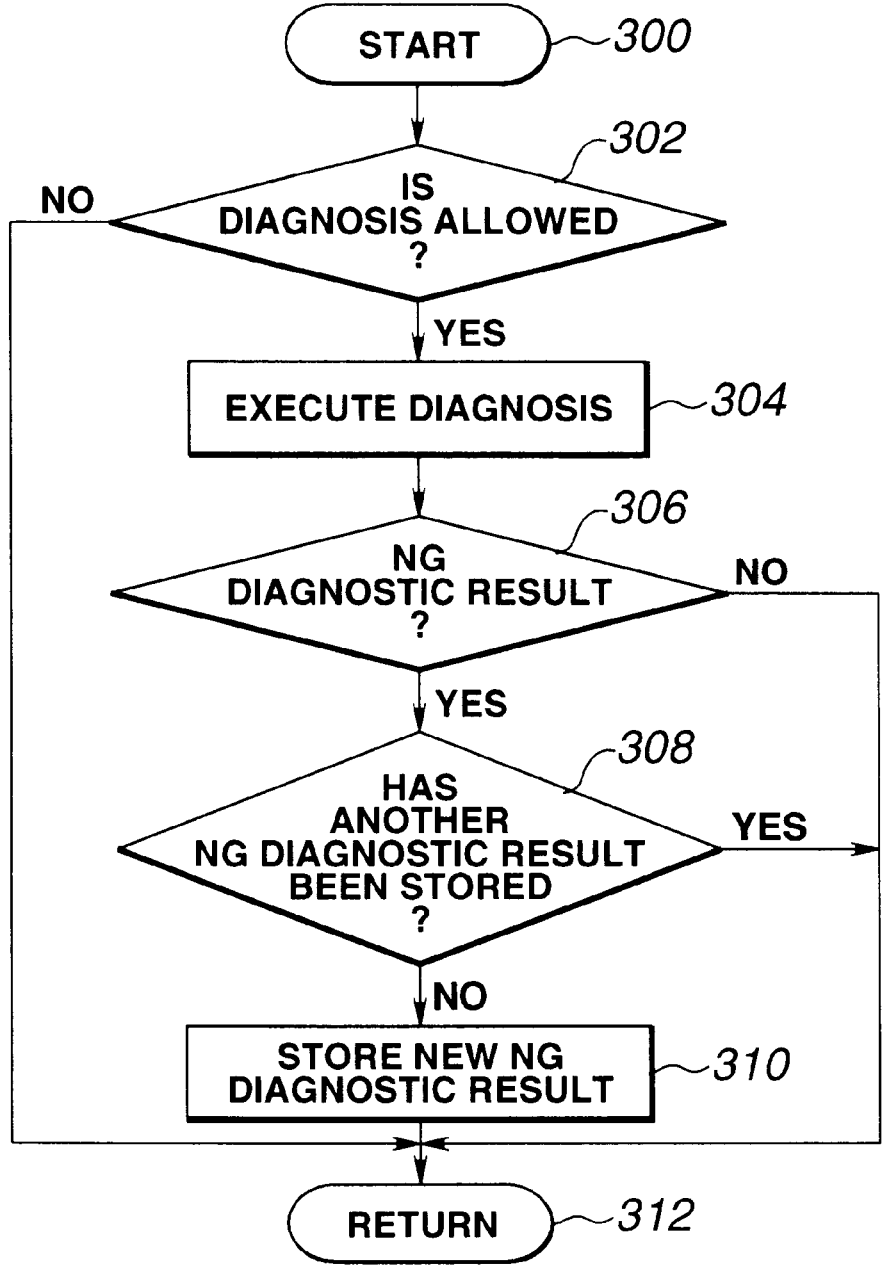

TROUBLE DIAGNOSTIC APPARATUS

BACKGROUND OF THE INVENTION

This invention relates to an apparatus for diagnosing malfunction and, more particularly, to a diagnostic apparatus applicable to diagnose misfire in an internal combustion engine.

For example, Japanese Patent Kokai No. 4-9635 discloses an engine misfire diagnostic apparatus which provides a diagnostic result indicating whether misfire for accured in one or more engine cylinders. The apparatus diagnoses misfire in one engine cylinder to provide a first indication that misfire occurs in a single cylinder and, then, it diagnoses misfire in another engine cylinder to provide a second indication that misfire has occured in a plurality of engine cylinders. With the conventional diagnostic apparatus, however, the first indication remains after the second indication is provided. For the simultaneous indications, the serviceman would repair the one engine cylinder and leave the other cylinder as it is.

SUMMARY OF THE INVENTION

It is a main object of the invention to provide an improved diagnostic apparatus which can provide a reliable diagnostic result to improve repair efficiency.

There is provided, in accordance with the invention, a malfunction diagnostic apparatus comprising means for producing a result for each of at least two trouble diagnoses related to each other, and means for retaining one of the diagnostic results having a higher degree of necessity.

BRIEF DESCRIPTION OF THE DRAWINGS

This invention will be described in greater detail by reference to the following description taken in connection with the accompanying drawings, in which:

FIG. 4 is a flow diagram showing a modified form of the programming of the digital computer; and FIG. 5 is a flow diagram showing another modified form of the programming of the digital computer.

DETAILED DESCRIPTION OF THE INVENTION

Figure 1:
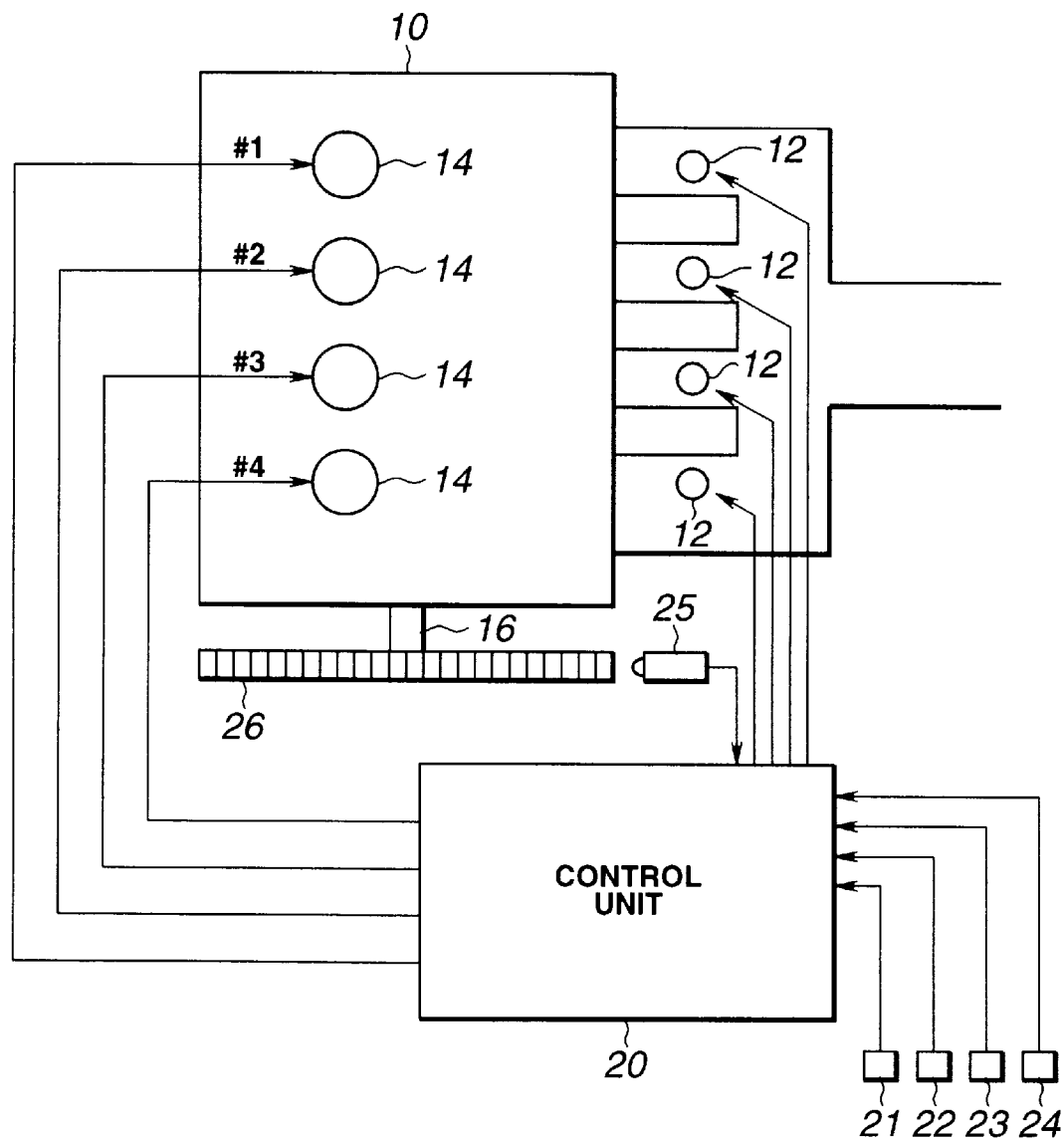
FIG. 1 is a schematic diagram showing one embodiment of a diagnostic apparatus made in accordance with the invention.

With reference to the drawings, and in particular to FIG. 1, there is shown a schematic diagram of a diagnostic apparatus embodying the invention. An internal combustion engine, generally designated by the numeral 10, for an automotive vehicle includes four combustion chambers or cylinders #1, #2, #3 and #4. The sequence or order of firing of the engine 10 is as follows: Cylinders #1, #3, #4, and #2. In the operation of the engine 10, fuel is injected through a fuel injector 12 toward the intake port of the corresponding one of the cylinders #1, #2, #3 and #4 and mixes with air therein. The engine is of the conventional four-cycle type. When the intake valve opens, the air-fuel mixture enters the corresponding combustion chamber. An upward stroke of the piston compresses the air-fuel mixture, which is then ignited by a spark produced by the corresponding spark plug 14 in the combustion chamber. Combustion of the air-fuel mixture in the combustion chamber takes place, releasing heat energy, which is converted into mechanical energy upon the power stroke of the piston. At or near the end of the power stroke, the exhaust valve opens and the exhaust gases are discharged from the combustion chamber.

The amount of fuel metered to the engine 10, this being determined by the width of the electrical pulses applied to the fuel injectors 12, and the spark-timing are repetitively determined through calculations performed in a control unit 20, these calculations being based upon various conditions of the engine that are sensed during its operation. These sensed conditions include engine speed N, intake air flow rate Q, engine coolant temperature Tw, and intake air temperature $T_Q$. Thus, a crankshaft position sensor 21, an airflow meter 22, an engine coolant temperature sensor 23 and an intake air temperature sensor 24 are connected to the control unit 20. The crankshaft position sensor 21 produces a series of crankshaft position electrical pulses each corresponding to one or two degrees of rotation of the engine crankshaft 16. The pulse have a repetition rate directly proportional to engine speed N and a series of reference electrical pulses at a predetermined number of (in the illustrated case 180) degrees. The reference electrical pulses include information for discriminating each of the cylinders #1, #2, #3 and #4. For example, the reference electrical pulses may include a pulse having a long pulse width to indicate the cylinder #1. The airflow meter 22 may be of the type comprising a thermosensitive wire placed in the air induction passage at a position upstream of the throttle valve for producing a sensor signal proportional to flow rate Q. The engine coolant temperature sensor 23 preferably is mounted in the engine cooling system and comprises a thermistor connected in an electrical circuit capable of producing a sensor signal proportional to coolant temperature Tw. The intake air temperature sensor 24 is placed to produce a sensor signal proportional to intake air temperature $T_Q$. A magnetic pickup transducer 25 is also connected to the control unit 20. The magnetic pickup transducer 25 is placed near the outer periphery of a toothed wheel 26 mounted for rotation with the engine crankshaft 16 and it produces an electrical pulse each time one tooth moves past the pickup transducer 25. The magnetic pickup transducer 25 and the toothed wheel 26 constitute a ring gear sensor.

The control unit 20, which may employ a digital computer including a a central processing unit, a random access memory, a read only memory and an input/output control unit, calculates the fuel delivery requirement, in the form of fuel injection pulse width and timing. A basic value $T_P$ for the fuel injection pulse width is calculated as a function of intake air flow rate Q and engine speed N as $T_P = k \cdot Q/N$ where k is a constant. The control unit corrects the calculated basic value $T_P$ based on various correction factors COEF to calculate the required value $T_I$ for the fuel injection pulse width, as $T_I = T_P \cdot COEF$. The control unit 20 sets the fuel injection pulse width and timing according to the calculated value for them. The control unit 20 also calculates the required spark timing as a function of engine speed N and basic fuel injection pulse width value $T_P$ and produces pulses to cause an ignition spark to be produced at the calculated time.

Figure 2A:
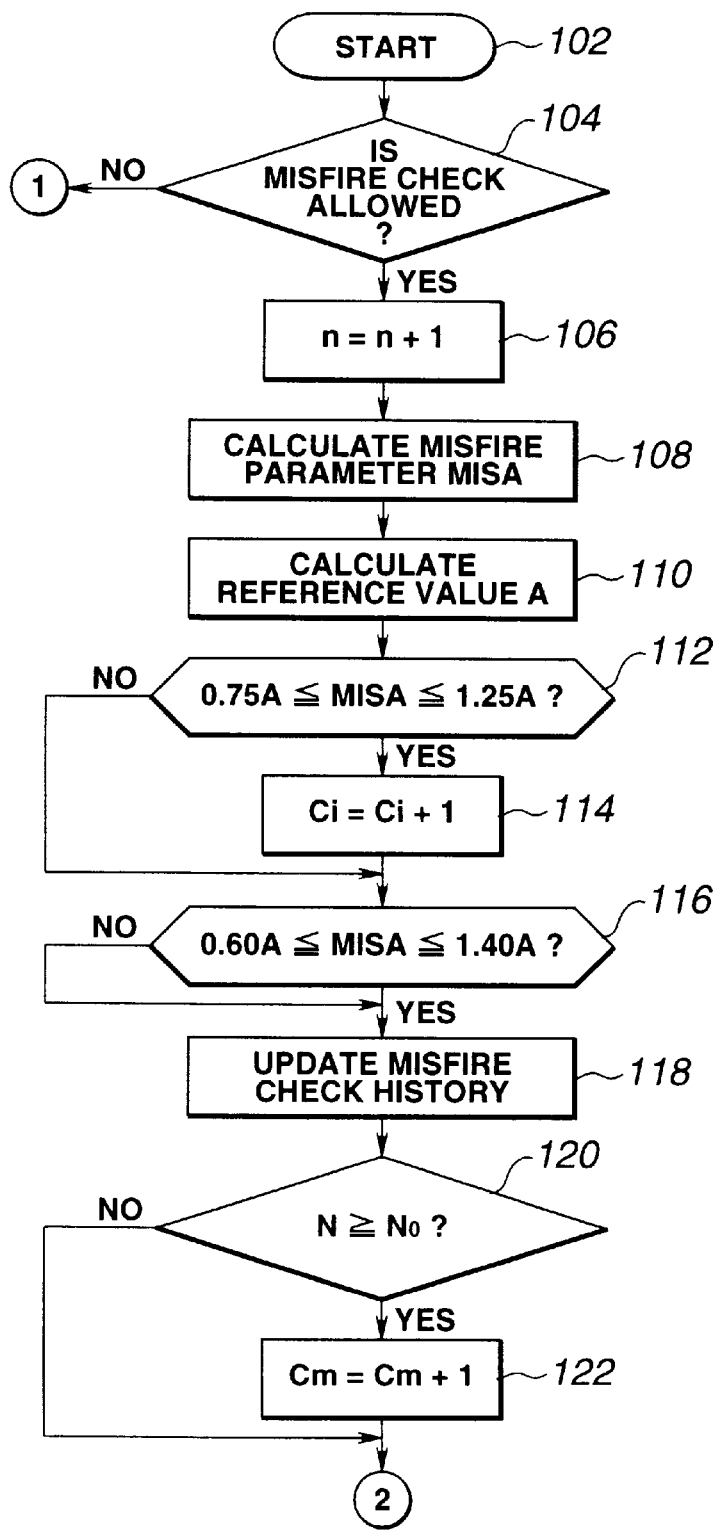
FIGS. 2A and 2B are flow diagrams showing the programming of a digital computer used to diagnose engine misfire.
Figure 2B:
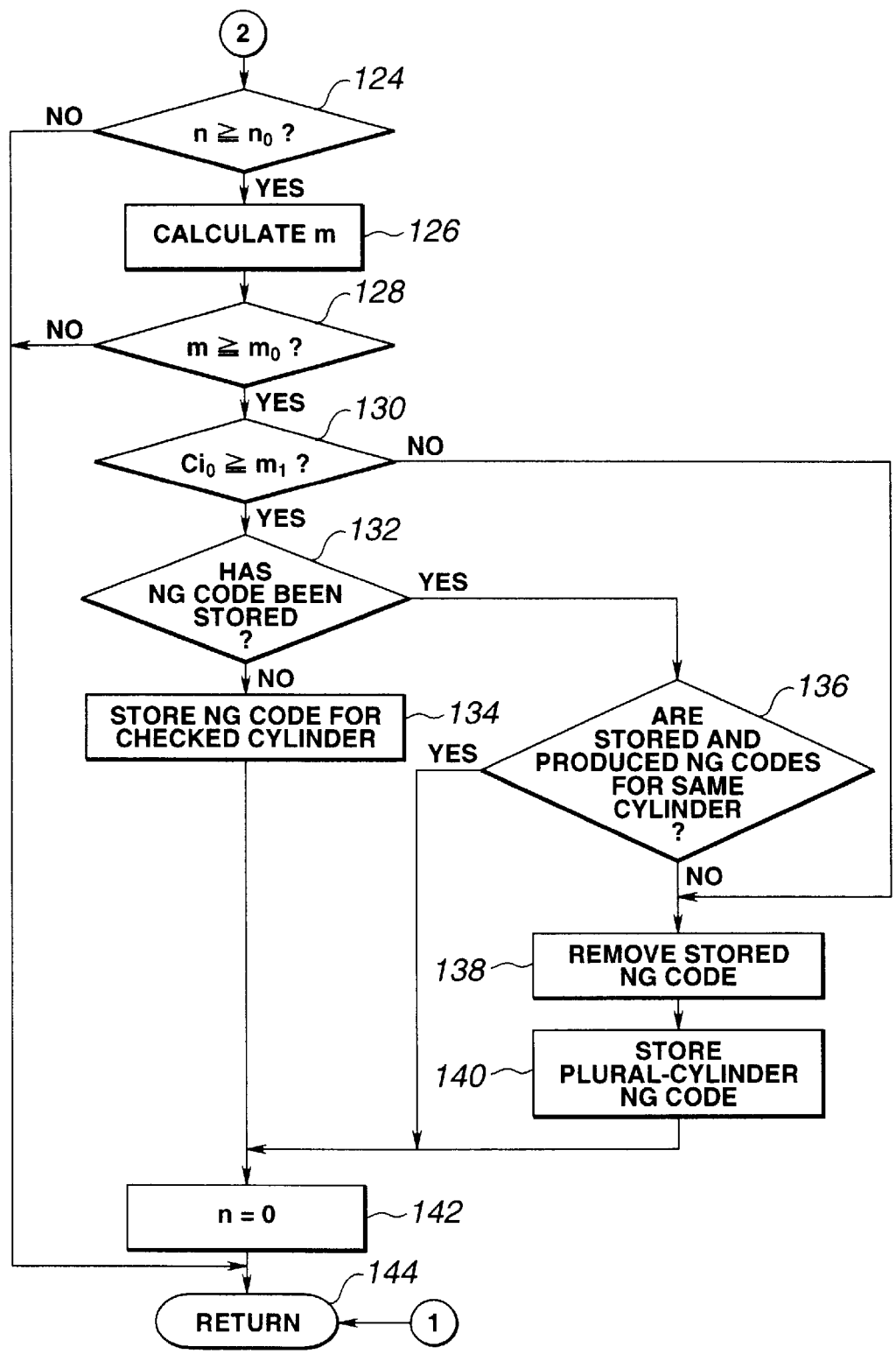

FIGS. 2A and 2B are flow diagrams illustrating the programming of the digital computer as it is used to diagnose engine misfire. The computer program is entered at the point 102. At the point 104 in the program, a determination is made as to whether or not an engine misfire check is allowed. If the three conditions are fulfilled, that is, when the time lapse after the starter switch is turned off exceeds a predetermined time, the engine coolant temperature Tw is in a predetermined range, and the intake air temperature $T_Q$ exceeds a predetermined value, the answer to this question is "yes" and the program proceeds to the point 106. Otherwise, the engine misfire check is inhibited and the program proceeds to the point 144 where the computer program is returned to the point 102. At the point 106, a counter is incremented by one step to indicate the total number n of times the engine misfire check has been made. This counter may be arranged to accumulate a count proportional to the engine rotational frequency while the engine misfire check is allowed so that the accumulated count corresponds to the total number n of times that the engine misfire check has been made. At the point 108, a misfire parameter MISA is calculated for each power stroke of the piston of each of the cylinders #1, #2, #3 and #4. The detail of this misfire parameter calculation will be described in connection with the flow diagram of FIG. 3. At the point 110, a reference value A is calculated from a relationship programmed into the computer. This relationship specifies the reference value A as a function of engine speed N and basic fuel injection pulse width value $T_P$ (engine load).

At the point 112 in the program, a determination is made as to whether the calculated misfire parameter MISA of each cylinder is in a first range of $0.75A \leq MISA \leq 1.25A$. If the answer to this question is "yes", then it is judged that misfire occurs in the corresponding one i of the cylinders #1, #2, #3 and #4 and the program proceeds to the point 114 where a corresponding one of single-cylinder misfire counters provided for the respective cylinders is incremented by one step. The count Ci of the single-cylinder misfire counter indicates the number of times misfire occurs in the corresponding cylinder. Following this, the program proceeds to the point 116. If the calculated misfire parameter MISA is out of the first range, then the program proceeds from the point 112 to the point 116. The cylinder for which misfire is checked is identified by the information included in the reference electrical pulses fed from the crankshaft position sensor 21. At the point 116, a determination is made as to whether the calculated misfire parameter MISA is in a second, wider range of $0.60A \leq MISA < 1.40A$. If the answer to this question is "yes", then it is judged that misfire occurs in the corresponding one i of the cylinders and the program proceeds to the point 118 where the misfire checking history stored in the computer is updated. The misfire checking history includes information related to the total number N of individual misfires of the four cylinders #1, #2, #3 and #4. At the point 120 in the program, a determination is made as to whether the total number N written in the misfire checking history is equal to or greater than a predetermined value $N_0$ that would indicate that misfires in multiple cylinders have occurred since the last update of the misfire history checking means (for example, 2 when misfire is checked once for all of the four cylinders #1, #2, #3 and #4 or 4 when misfire is checked twice for all of the four cylinders #1, #2, #3 and #4). If the answer to this question is "yes", then the program proceeds to the point 122 where a plural-cylinder misfire counter is incremented by one step and then to the point 124. The count Cm of the plural-cylinder misfire counter indicates the number of times misfire occurs in a plurality of cylinders #1, #2, #3 and #4. Otherwise, the program jumps from the point 122 to the point 124.

At the point 124 in the program, a determination is made as to whether the total number n counted at the point 106 is equal to or greater than a predetermined value $n_0$. If the answer to this question is "yes", then the program proceeds to the point 126. Otherwise, the program proceeds to the point 144. At the point 126, the total number m of times it is judged that misfire occurs during the period where the total number n is accumulated or counted is calculated. The computer calculates the total number m by summing the counts Ci of the single-cylinder misfire counters and the count Cm of the plural-cylinder misfire counter. At the point 128, a determination is made as to whether the total number m is equal to or greater than a predetermined value $m_0$. If the answer to this question is "yes", then it means that misfire occurs one or more cylinders and the program proceeds to the point 130. Otherwise, the program proceeds to the point 144.

At the point 130 in the program, a determination is made as to whether only one $C_{i_0}$ of the counts Ci of the single-cylinder misfire counters is equal to or greater than a predetermined value m1. If the answer to this question is "yes", then it is judged that misfire occurs in one of the cylinders and the program proceeds to the point 132. Otherwise, it is judged that misfire occurs in a plurality of cylinders and the program proceeds to the point 138. At the point 132, a determination is made as to whether an NG code has been set or stored in the computer memory. The NG codes include four single-cylinder NG codes each of which is stored in the computer memory when it is judged that misfire occurs only in a corresponding one of the four cylinders, and a plural-cylinder NG code which is stored in the computer memory when it is judged that misfire occurs in a plurality of cylinders. If the answer to this question is "yes", then the program proceeds to the point 136. Otherwise, the program proceeds to the point 134 where a single-cylinder NG code is stored in the computer memory for the corresponding cylinder. Following this, the program proceeds to the point 142.

At the point 136 in the program, a determination is made as to whether the cylinder in which misfire is judged in the present cycle of execution of the program is identical with the cylinder specified by the NG code stored in the computer memory. If the answer to this question is "yes", then the program proceeds to the point 142. Otherwise, it is judged that misfire occurs in a plurality of cylinders and the program proceeds to the point 138. It is to be understood, of course, that the answer to the question inputted at the point 136 is "no" if the NG code stored in the computer memory is a plural-cylinder NG code.

The NG code stored in the computer memory is removed at the point 138 and replaced with a plural-cylinder NG code at the point 140. Upon completion of this NG code replacement, the program proceeds to the point 142 where the count n, which indicates the total number of times the engine misfire has been checked, is cleared to zero. Following this, the program proceeds to the point 144.

When it is judged that misfire occurs in a plurality of cylinders after a single-cylinder NG code is stored in the computer memory to indicate a judgment that misfire occurs only in one of the cylinders, the single-cylinder NG code is removed and replaced with a plural-cylinder NG code. Therefore, the operator may repair the cylinders specified by the plural-cylinder NG code store in the computer memory.

Figure 3:
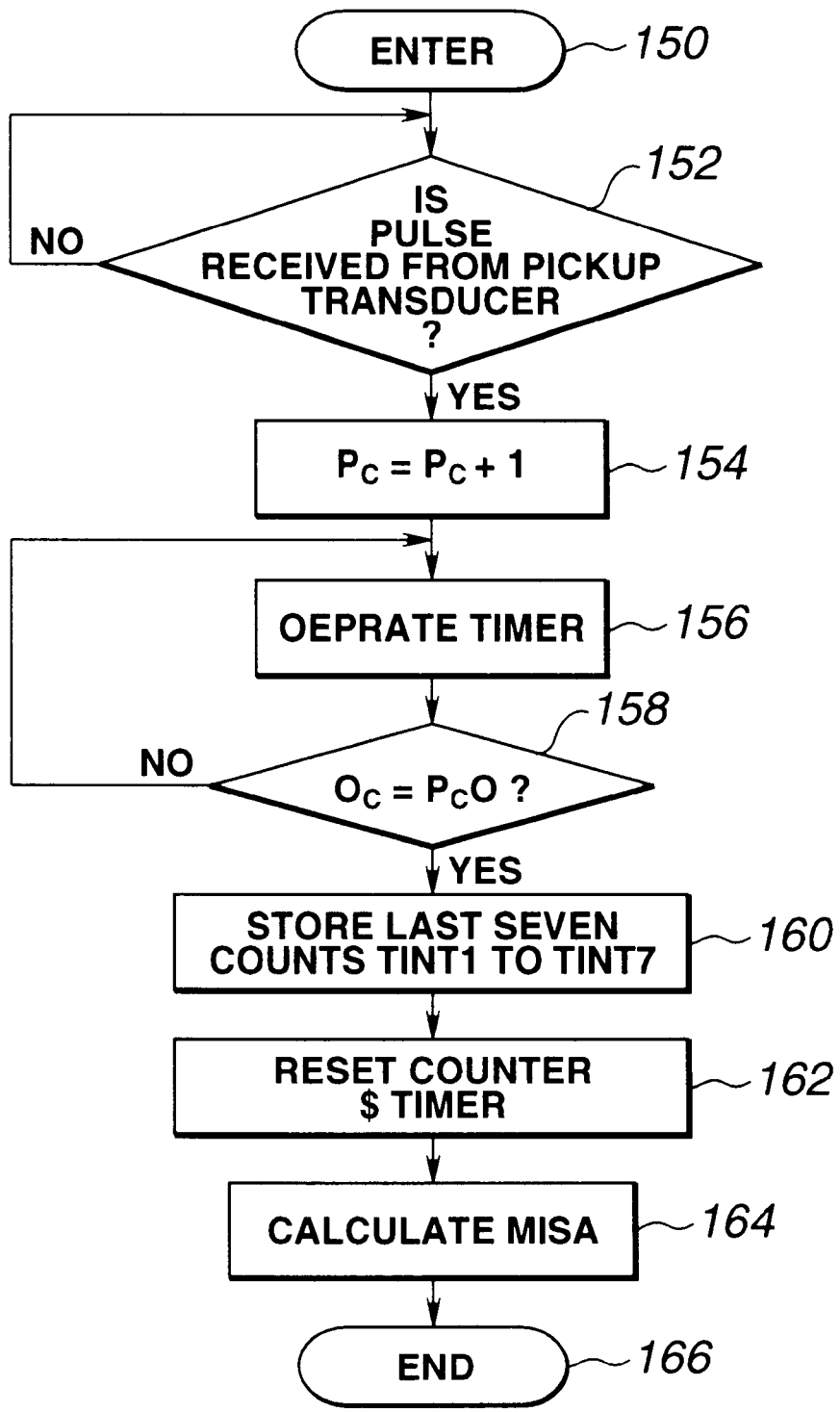
FIG. 3 is a flow diagram showing the programming of a digital computer used to calculate a misfire parameter.

FIG. 3 is a flow diagram illustrating the above calculation of the misfire parameter MISA. At the point 150 in FIG. 3, which corresponds to the point 108 of FIG. 2A, the computer program is entered. At the point 152, a determination is made as to whether an electrical pulse is produced from the magnetic pickup transducer 25. If the answer to this question is "yes", then the program proceeds to the point 154. Otherwise, the program is returned to the point 152. At the point 154, a counter is incremented by one step. The count Pc of this counter indicates the degree of rotation of the engine crankshaft 16. At the point 156, the computer operates a timer to measure the time required for the engine crankshaft 16 to rotate a predetermined number of degrees. At a point 158 in the program, a determination is made as to whether the count Pc reaches a predetermined value $Pc_0$. If the answer to this question is "yes", then it means that the engine crankshaft 16 rotates at a predetermined number of degrees, for example, 180°=720°/4, corresponding to the cylinder stroke phase difference, and the program proceeds to the point 160. At the point 160, the count TINT1 of the timer is read into the computer memory. The computer memory stores the last seven counts TINT1, TINT2, TINT3, TINT4, TINT5, TINT6 and TINT7 in sequence. At the point 162, the counter and timer are reset. At the point 164, the computer calculates the misfire parameter MISA from the following equation:

$$MISA=[3\times(TINT6-TINT7)+(TINT6-TINT3)]/TINT7^3$$

Upon completion of the above calculation, the program proceeds to the end point 166 which corresponds to the point 110 of FIG. 2A.

FIG. 4 is a flow diagram illustrating a modified form of the programming of the digital computer. The invention handles two diagnostic results related to each other. One of the diagnostic results involves the other diagnostic result in the first embodiment, whereas one of the diagnostic results is a cause of the other diagnostic result in this modification. The computer program is entered at the point 200. At the point 202 in the program, a determination is made as to whether the malfunction diagnosis is allowed. If the answer to this question is "yes", then the program proceeds to the point 204 where diagnosis is executed. Otherwise, the program proceeds to the point 216 where the computer program is returned to the point 202.

At the point 206 in the program, a determination is made as to whether the present diagnostic result is NG. If the present diagnostic result is OK, then the program proceeds to the point 216. If the present diagnostic result is NG, then the program proceeds to another determination step at the point 208. This determination is as to whether an NG diagnostic result has been stored in the computer memory for the other diagnostic result related to the present diagnostic result. If the answer to this question is "yes", then the program proceeds to another determination step at the point 210. This determination is as to whether the present NG diagnostic result has a higher priority than the stored NG diagnostic result. Assuming now that one of the NG diagnostic results related to each other is a cause of the other NG diagnostic result, the one NG diagnostic result has a higher priority than the other NG diagnostic result. For example, when a first NG diagnostic result is obtained through failure of the system for supplying fuel to a specified cylinder and a second NG diagnostic result is obtained in the presence of misfire in the specified cylinder, the first NG diagnostic result has a higher priority than the second NG diagnostic result. If the answer to this question is "yes", then the stored NG diagnostic result is updated by the present NG diagnostic result and then to the point 216. Otherwise, the program jumps the point 212 to the point 216. If the answer to the question inputted at the point 208 is "no", then the program proceeds to the point 214 where the present NG diagnostic result is stored in the computer memory. Following this, the program proceeds to the point 216.

In general, the one NG diagnostic result having a higher priority is obtained in a longer time and stored in the computer memory after the other NG diagnostic result. Since the one NG diagnostic result is removed and replaced with the other NG diagnostic result, the operator can speedily identify the fundamental cause of the NG diagnostic result with reference to the NG diagnostic result. It is, therefore, possible to improve the repair efficiency and reliability.

FIG. 5 is a flow diagram illustrating another modified form of the programming of the digital computer. In this modification, the result of a first diagnosis can be NG as long as the result of a second diagnosis is OK. For example, the first diagnosis relates to engine misfire and the second diagnosis relates to failure in the ring gear sensor (25, 26) used in the engine misfire diagnosis. Since it takes much time to diagnose the ring gear sensor failure than the engine misfire, the engine misfire diagnostic result would be produced prior to the ring gear sensor failure diagnostic result. However, the NG diagnostic result related to the engine misfire is reliable only when the ring gear sensor is in order. It is, therefore, preferable to produce the NG diagnostic result related to the engine misfire after an OK ring gear sensor failure diagnostic result is produced even though the NG misfire diagnostic result is produced.

The computer program is entered at the point 300. At the point 302 in the program, a determination is made as to whether the trouble diagnosis is allowed. If the answer to this question is "yes", then the program proceeds to the point 304 where a trouble diagnosis is executed. Otherwise, the program proceeds to the point 312 where the computer program is returned to the point 302. At the point 306 in the program, a determination is made as to whether the present diagnostic result is NG. If the present diagnostic result is OK, then the program proceeds to the point 312. If the present diagnostic result (for example, misfire diagnostic result) is NG, then the program proceeds to another determination step at the point 308. This determination is as to whether the other diagnostic result (for example, ring gear sensor failure diagnostic result) related to the present diagnostic result is NG. If the answer to this question is "yes", then the program proceeds to the point 312. Otherwise, the program proceeds to the point 310 where the present NG diagnostic result is stored in the computer memory. Following this, the program proceeds to the point 312.

In this modification, when the reliability of the NG result of a first diagnosis is ensured as long as the result of a second diagnosis is OK, the NG diagnostic result of the first diagnosis is stored in the computer memory. It is, therefore, possible to improve the reliability of the diagnostic result stored in the computer memory and improve the repair efficiency.

According to the invention, the diagnostic apparatus comprises means for producing a result for each of at least two diagnoses related to each other, and means for retaining one of the diagnostic results having a higher degree of necessity. Since only the diagnostic result having a higher degree of necessity or priority is left in the computer memory, the serviceman can make an appropriate repair according to the reliable diagnostic result without being misled by other diagnostic results. The one diagnostic result may be one involving the other diagnostic result. For example, the one diagnostic result relates to misfire in a plurality of engine cylinders and the other diagnostic result relates to misfire in a single engine cylinder. It is, therefore, possible to deal with all of the malfunction without leaving unsolved malfunction. Alternatively, the one diagnostic result relates to a cause of the other diagnostic result. This is effective for the serviceman to remove the basic cause of the malfunction. Alternatively, the diagnostic apparatus may be arranged in such a manner that the one diagnostic result is NG as long as the other diagnostic result is OK. This is effective to improve the reliability of the NG diagnostic result.

In a further embodiment of the invention, a malfunction diagnostic apparatus may provide diagnostic results for malfunctions that involve misfires in cylinders of an automotive vehicle based on ratios of the number of misfires in a cylinder to the total number of detected misfires. For example, the apparatus may include a misfire detection means for detecting misfires in each of the cylinders of the engine for each power stroke of the engine. A further means determines a first value representing the number of misfires detected for all cylinders of the engine, and a related means determines second values representing the number of misfires of each individual cylinder. A further related means determines a ratio of the number of misfires in a cylinder to the total number of detected misfires. A further related means determines whether the ratio for a given cylinder is greater than or equal to a predetermined value. A means for detecting a first malfunction condition may therefore detect the occurrence of a misfire malfunction condition in a single cylinder when the ratio for only one cylinder exceeds a predetermined ratio, and the occurrence of a misfire condition in more than one cylinder when the ratio for more than one cylinder exceeds the predetermined ratio.

What is claimed is:

1. A malfunction diagnostic apparatus comprising:
   means for detecting a first malfunction condition and for generating a first diagnostic result representing the first malfunction condition;
   means for detecting a second malfunction condition which is caused by the first malfunction condition and for generating a second diagnostic result representing the second malfunction condition; and
   means for indicating only the first malfunction condition to an operator when both of the first and second diagnostic results are generated.

2. A malfunction diagnostic apparatus for use with an internal combustion engine of an automotive vehicle having a plurality of cylinders supplied with fuel through respective fuel supply systems, comprising:
   means for detecting a malfunction condition in one of the fuel supply systems and for generating a first diagnostic result representing the malfunction condition in the fuel supply system;
   means for detecting misfire in a cylinder associated with the fuel supply system and for generating a second diagnostic result representing the misfire in the cylinder; and
   means for indicating only the malfunction condition detected in the fuel supply system when both of the first and second diagnostic results are generated.

3. The malfunction diagnostic apparatus as defined in claim 1, wherein the apparatus is used with a device having a plurality of elements operable in the device, wherein the first malfunction condition comprises occurrence of malfunctions in at least two elements of the device, wherein the second malfunction condition comprises occurrence of malfunction in only one element of the device.

4. The malfunction diagnostic apparatus as defined in claim 1, wherein the apparatus is used with an internal combustion engine of an automotive vehicle having a plurality of cylinders operable in the automotive vehicle,
   wherein the first malfunction condition comprises misfires in at least two cylinders of an internal combustion engine, and wherein the second malfunction condition comprises a misfire in only one cylinder of the internal combustion engine.

5. The malfunction diagnostic apparatus as defined in claim 1, wherein the apparatus is used with an internal combustion engine of an automotive vehicle having a plurality of cylinders operable in the automotive vehicle, the apparatus further comprising:
   misfire detecting means for detecting misfires occurring in the cylinders during each power stroke of the cylinders;
   means for determining respective values ($C_i$) representing a number of times the misfire detecting means detects a misfire for a cylinder;
   means for determining a value (m) representing a number of times that the misfire detecting means detects a misfire;
   means for determining for each cylinder a ratio of its respective value ($C_i$) to the value (m);
   means for determining whether a ratio of a cylinder is not less than a predetermined ratio (r),
   wherein the first malfunction condition comprises multiple cylinder misfire wherein at least two of the respective ratios are not less than the predetermined ratio (r), and
   wherein the second malfunction condition comprises single cylinder misfire wherein only one of the respective ratios is not less than the predetermined ratio (r).

6. The malfunction diagnostic apparatus as defined in claim 1, wherein the apparatus is used with an internal combustion engine of an automotive vehicle having a plurality of cylinders operable in the automotive vehicle, the malfunction diagnostic apparatus further comprising:
   misfire detecting means for detecting misfires occurring in the cylinders during each power stroke of the cylinders;
   means for determining respective values ($C_i$) representing a number of times the misfire detecting means detects a misfire for a cylinder;
   means for determining a value (m) representing a number of times that the misfire detecting means detects a misfire;
   means for determining whether each respective value ($C_i$) is not less than a predetermined value ($m_1$) when the value (m) equals a predetermined value ($m_0$),
   wherein the first malfunction condition comprises multiple cylinder misfire wherein at least two of the respective values ($C_i$) is not less than the predetermined value ($m_1$) when the value (m) equals the predetermined value ($m_0$), and
   wherein the second malfunction condition comprises single cylinder misfire wherein only one of the respective values ($C_i$) is not less than the predetermined value ($m_1$) when the value (m) is equal to the predetermined value ($m_0$).

* * * * *